US010933885B1

(12) United States Patent
 Banks, III

(10) Patent No.: US 10,933,885 B1
(45) Date of Patent: Mar. 2, 2021

(54) ACCELERATOR PEDAL SIGNAL MODIFIER SAFETY BYPASS SYSTEMS

(71) Applicant: Gale C. Banks, III, Bradbury, CA (US)

(72) Inventor: Gale C. Banks, III, Bradbury, CA (US)

( * ) Notice: Subject to any disclaimer, the term of this patent is extended or adjusted under 35 U.S.C. 154(b) by 0 days.

(21) Appl. No.: 17/091,921

(22) Filed: Nov. 6, 2020

Related U.S. Application Data

(60) Provisional application No. 62/931,676, filed on Nov. 6, 2019, provisional application No. 62/944,520, filed on Dec. 6, 2019.

(51) Int. Cl.
 *B60W 50/032* (2012.01)
 *B60W 50/02* (2012.01)
 *G07C 5/08* (2006.01)

(52) U.S. Cl.
 CPC ...... *B60W 50/032* (2013.01); *B60W 50/0205* (2013.01); *G07C 5/0808* (2013.01); *B60W 2510/1005* (2013.01); *B60W 2540/10* (2013.01)

(58) Field of Classification Search
 CPC ............ B60W 50/032; B60W 50/0205; B60W 2540/10; B60W 2510/1005; G07C 5/0808
 See application file for complete search history.

(56) References Cited

U.S. PATENT DOCUMENTS

2020/0039499 A1* 2/2020 Passman ............... B60W 20/10

* cited by examiner

*Primary Examiner* — Michael V Kerrigan
(74) *Attorney, Agent, or Firm* — Karish & Bjorgum, PC

(57) ABSTRACT

A fail-safe system for accelerator pedal signal modifiers of throttle-by-wire systems for vehicles has a CPU electronically between an accelerator pedal position signal and a vehicle ECU using routines to modify the accelerator pedal position signal to the ECU. The system is monitored for faults and bypasses the modification routines to transmit the unmodified accelerator pedal position signal to the ECU when the accelerator pedal signal modifier has failed. The ECU is also monitored to detect the status of the vehicle transmission. When reverse gear is initiated, the modification routines are bypassed to transmit the unmodified accelerator pedal position signal to the ECU.

5 Claims, 4 Drawing Sheets

ACCELERATOR PEDAL SIGNAL MODIFIER
SAFETY BYPASS SYSTEMS

BACKGROUND OF THE INVENTION

Most modern throttle-by-wire circuits consist of potentiometer sensors varying voltage. These potentiometers are normally mounted on the accelerator pedal mechanism itself. Based on the Accelerator Pedal Position (APP), the potentiometers will output a certain voltage, usually 0 to 5V, depending on how far the pedal is depressed. The Engine Control Unit (ECU) reads and equates the voltage reading to open an airflow regulating device in Spark Ignition (SI) engines, or control fuel flow regulation in Compression Ignition (CI) engines. A predetermined transfer function (ratio of the APP to voltage output) instructs the ECU as to the drivers pedal input and the ECU then generates a control value resulting in the intended acceleration or deceleration of the vehicle.

Throttle-by-wire systems seen in vehicles often contain two sensors, working in conjunction and constantly being monitored against one another. Should one fail or behave strangely, the vehicle will go into a "Limp" mode, and limit the maximum power output until the issue is fixed, preventing dangerous unintended acceleration or sudden deceleration.

Throttle-by-wire systems are complex in nature and have a series of "checks & balances" for ultimately performing a single basic function, accelerate the vehicle. The OEM programming (or transfer function) of the system also results in the biggest complaint seen in these systems today, lack of pedal response and/or sensitivity. Most vehicles today have a noticeable lack of sensitivity when it comes to accelerator pedal response rate.

To enhance the responsiveness of such OEM throttle-by-wire systems, accelerator pedal signal modifiers have been developed. These are typically modules that plug into the accelerator system between the accelerator pedal and the ECU to modify the pedal signal being delivered to the ECU. This modification is to adjust the airflow or fuel regulation at any pedal position. This is a change of the accelerator pedal transfer function such that the characteristics and sensitivity of how the accelerator pedal behaves can be manipulated. For example, depressing the accelerator pedal down 50% of the way to the floor in a stock throttle-by-wire system will cause the ECU to sense a demand for 50%, and will adjust the airflow or fuel regulation accordingly. In a modified system set on an aggressive mode, the signal to the ECU is modified, causing the ECU to assume that much more acceleration is desired, possibly around 90%. Signal modifiers deliver increased engine response, and consequently illustrates the popularity of these signal modifier modules. The same goes for the inverse aspect; modes that dampen the responsiveness and sensitivity in an effort to decrease fuel consumption, thereby increasing fuel economy.

SUMMARY OF THE INVENTION

The present invention is directed to a fail-safe system for the accelerator pedal signal modifier of throttle-by-wire systems.

In a first aspect of the present invention, the fail-safe process for accelerator pedal signal modifiers of throttle-by-wire systems has a central processing unit (CPU) electronically between an accelerator pedal position signal and a vehicle ECU. Faults in the operation of the CPU are monitored. When a fault is sensed, the operation of the accelerator pedal signal modifier is bypassed to send the unmodified accelerator pedal position signal to the vehicle ECU.

In a second aspect of the present invention, a throttle-by-wire system with a vehicle ECU and an accelerator pedal producing an accelerator pedal position signal includes a CPU electronically between the accelerator pedal position signal and the vehicle ECU. The CPU includes a routine modifying the accelerator pedal position signal and a safety bypass around that routine. A relay controlled by faults in the CPU actuates the safety bypass.

In a third aspect of the present invention, the fail-safe system for accelerator pedal signal modifiers of throttle-by-wire systems has a central processing unit (CPU) electronically between an accelerator pedal position signal and a vehicle ECU. The state of the vehicle transmission is monitored. When the vehicle transmission is sensed to be in reverse gear, the operation of the accelerator pedal signal modifier is rerouted through a reverse gear bypass circuit to send the unmodified accelerator pedal position signal to the vehicle ECU.

Thus, it is an object of the present invention to provide an improved accelerator pedal signal modifier for a throttle-by-wire system. Other objects and advantages will appear hereinafter.

Figure 1:
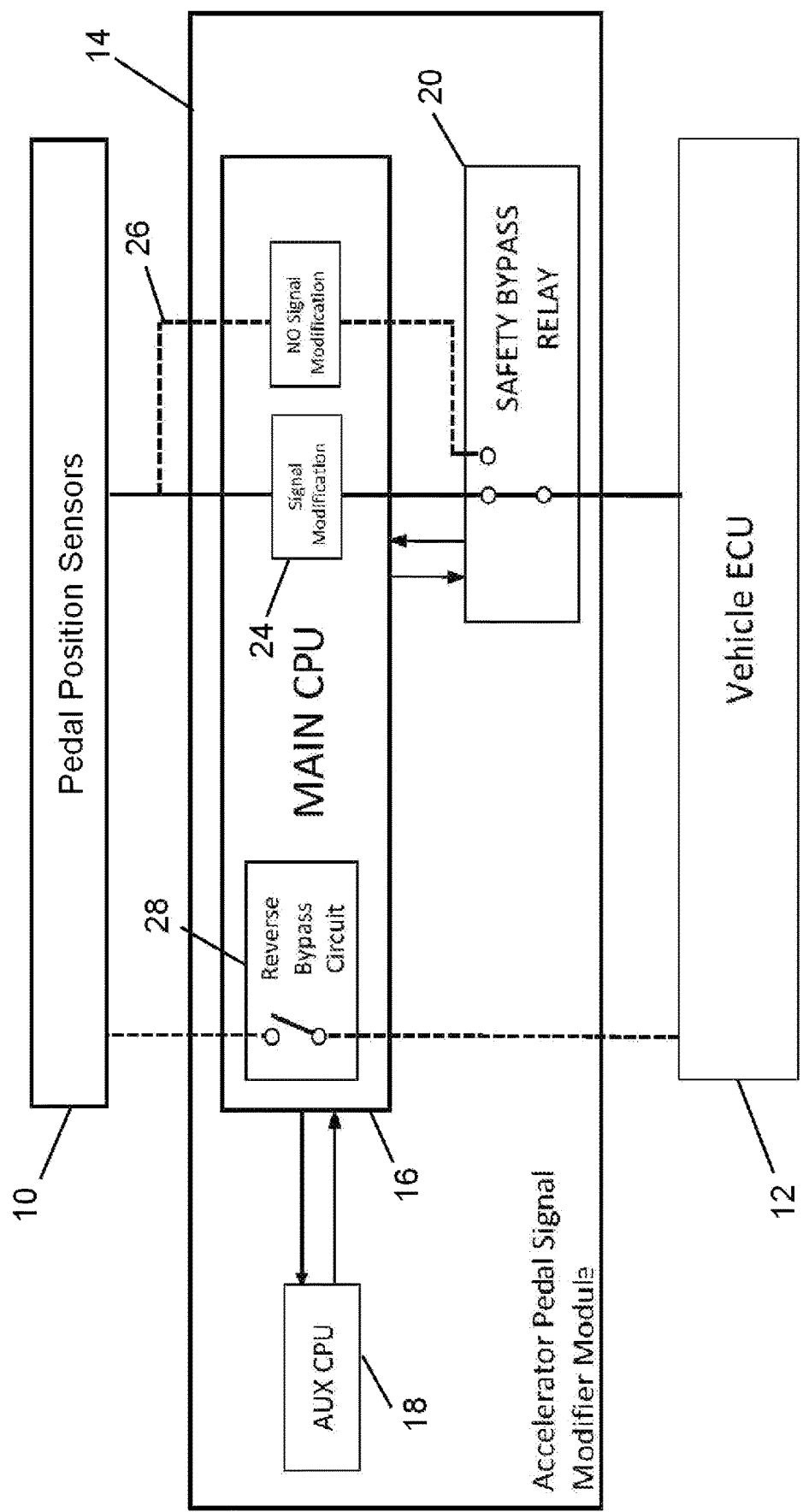
FIG. 1 is a schematic illustration of a throttle-by-wire system with a relay in a normal operation mode.
Figure 2:
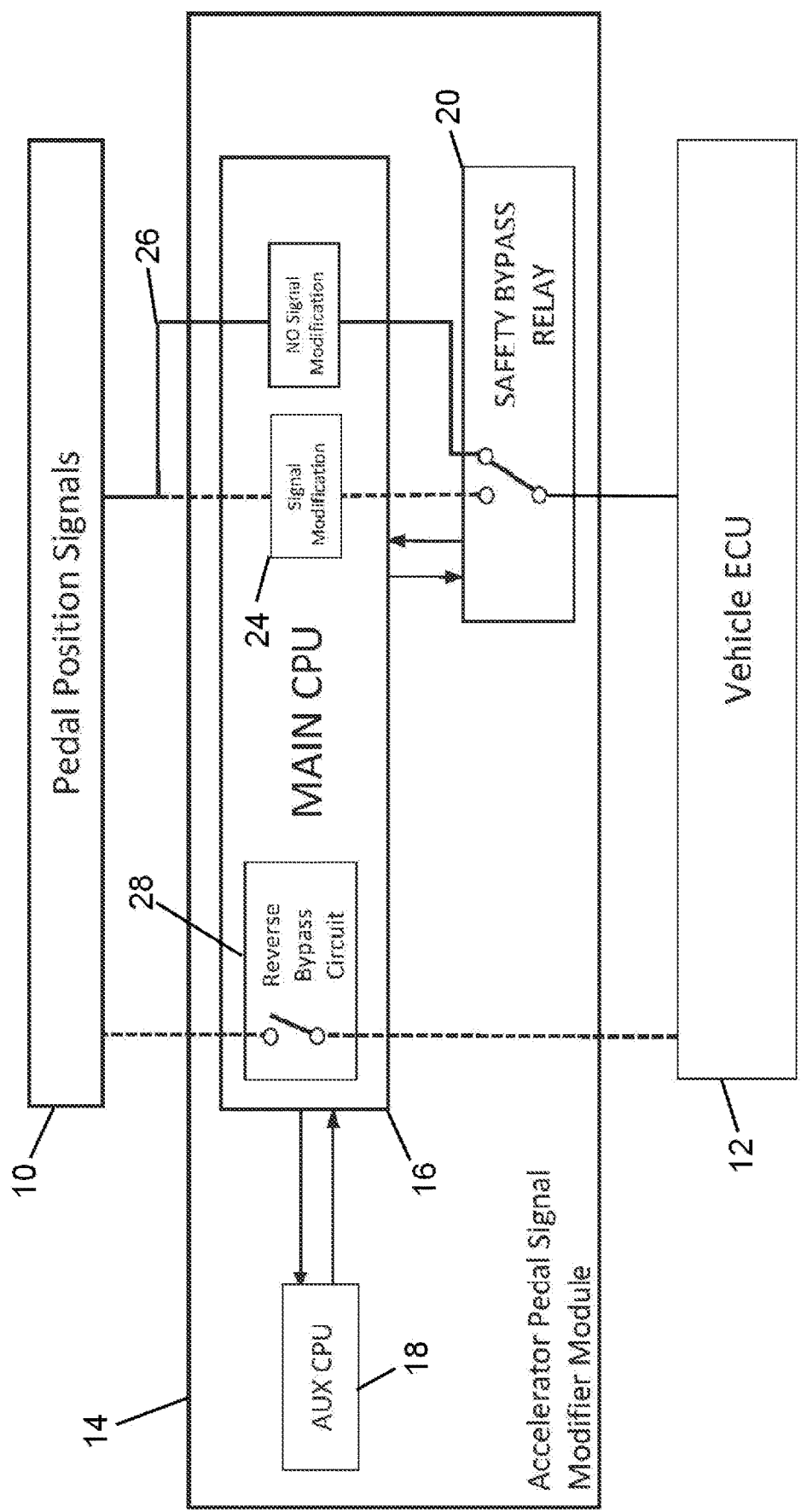
FIG. 2 is a schematic illustration of a throttle-by-wire system of FIG. 1 with the relay in a fail-safe safety bypass operation mode.
Figure 3:
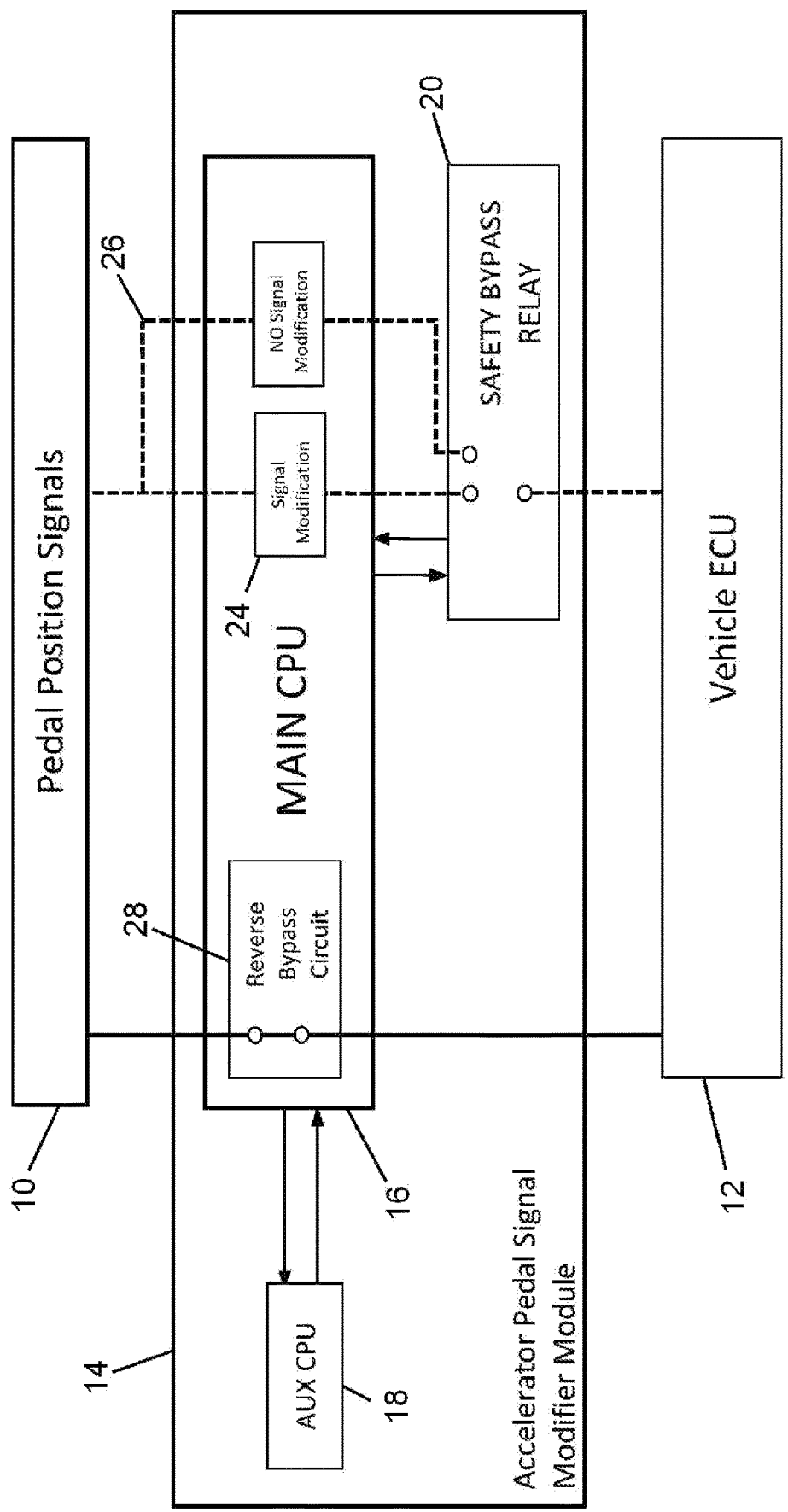
FIG. 3 is a schematic illustration of a throttle-by-wire system of FIG. 1 in a reverse bypass operating mode.
Figure 4:
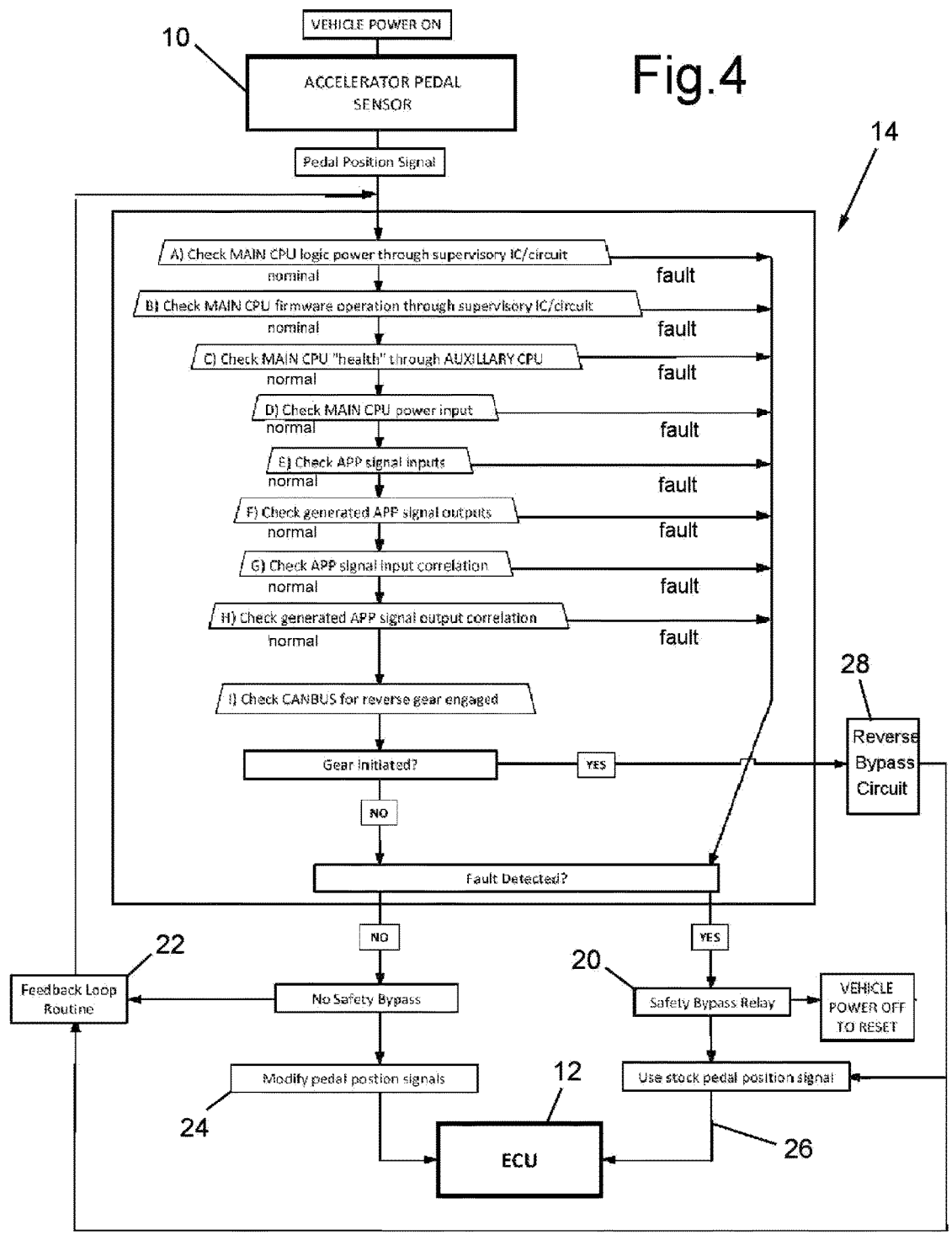
FIG. 4 is a logic diagram of the throttle-by-wire system of FIGS. 1 and 2.

DETAILED DESCRIPTION OF THE
PREFERRED EMBODIMENTS

Turning in detail to the figures, a throttle-by-wire system includes accelerator pedal position sensors 10. OEM systems often include two or more such sensors generating pre-programed signals. The present system may operate on each signal or on a composite of the two. The system also includes a vehicle ECU 12. The ECU 12 is configured to process the accelerator pedal position signals from the accelerator pedal position sensors 10 to control an airflow regulating device in SI engines, or control fuel flow regulation in CI engines. An accelerator pedal signal modifier 14 is located electronically between the accelerator pedal position sensors 10 and the vehicle ECU 12.

In aftermarket equipment, the accelerator pedal position sensors 10 and the vehicle ECU 12 are original equipment. The accelerator pedal modifier 14 is then separately supplied. Such modifiers 14 can incorporate multiple routines to provide for different vehicle engine responses to accelerator pedal position. One routine may increase pedal sensitivity to provide more apparent power while another may decrease pedal sensitivity to promote more economical engine operation.

In the present embodiment, the accelerator pedal signal modifier 14 includes a CPU 16 and an auxiliary CPU 18. The CPU 16 is shown to be electronically connected between the accelerator pedal position sensors 10 and the vehicle ECU 12 as part of the module of the accelerator pedal signal modifier 14. The multiple routines are included within the CPU 16 to modify the pedal signal to the ECU to provide for different vehicle engine responses to the accelerator pedal positions. The auxiliary CPU 18 communicates with the CPU 16 to provide monitoring of certain functions of the CPU 16.

The CPU 16 includes various fault detecting subroutines to check CPU function by monitoring various CPU parameters and to provide fault signals as appropriate. The auxiliary CPU 18 provides a similar function. In the preferred embodiment, the subroutines in the CPU 16 and auxiliary CPU 18 monitor for the following faults:

A) The MAIN CPU logic power through the supervisory IC/circuit;
B) The MAIN CPU firmware operation through the supervisory IC/circuit;
C) The MAIN CPU "health" through the AUXILLARY CPU;
D) The MAIN CPU power input;
E) The APP signal inputs;
F) The generated APP signal outputs;
G) The APP signal inputs correlation;
H) The generated APP signal output correlation;

Any resulting fault signals are accumulated and directed to actuate a safety bypass relay 20.

A control circuit including a feedback loop routine 22 cycles through the fault detecting subroutines. When there are no detected faults, this cycle continues and the accelerator pedal position signal is directed to the multiple routines 24 included within the CPU 16 to modify the pedal signal. The modified pedal signal is distributed to the ECU 12. When one or more faults are detected by the fault detecting subroutines, the safety bypass relay 20 is actuated.

The safety bypass relay 20 routes the accelerator pedal position signals directly to the ECU through a safety bypass circuit 26 without including the multiple modification routines. There is no modified accelerator pedal position signals directed to the vehicle ECU 12 when the safety bypass relay 20 is activated. Thus, if the accelerator pedal signal modifier 14 fails, the original accelerator pedal signal or signals are directed to the ECU 12 and standard control is returned. If this occurs, the safety bypass relay 20 is retained in this bypass condition until power to the system is interrupted by switching off the vehicle engine. If the fault persists, each time the vehicle engine is started, the accelerator pedal signal modifier 14 will again default to this bypassed mode; and the vehicle can be driven normally as if the accelerator pedal signal modifier 14 was not in the system.

A further safety feature is provided in this preferred embodiment. The accelerator pedal signal modifier 14 will cease to modify the accelerator pedal position signals if the vehicle is put into reverse gear. A subroutine I in the CPU 16 monitors the status of the vehicle's CANBUS system or network to detect if reverse gear has been initiated. When reverse gear has been initiated, a reverse bypass circuit 28 terminates use of the multiple routines 24 to modify the pedal signal to the ECU 12. When the CANBUS channel no longer indicates that the vehicle transmission is in reverse, the subroutine I returns the reverse bypass circuit 28 to the default position, engaging the feedback loop routine 22 and the modification of the pedal signal to the ECU 12. This ensures that an aggressive mode of accelerator pedal operation will not be used in reverse.

Thus, a fail-safe accelerator pedal signal modifier for throttle-by-wire systems has been disclosed. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A fail-safe process for accelerator pedal signal modifiers of throttle-by-wire systems having a CPU electronically located between an accelerator pedal position signal and a vehicle ECU, comprising the steps of
sensing the accelerator pedal position signal;
transmitting the accelerator pedal position signal to the CPU;
checking the status of multiple parameters of the CPU;
sensing faults in the CPU based on the status of the multiple parameters of the CPU;
modifying the accelerator pedal position signal based on a preselected function;
bypassing the step of modifying the accelerator pedal position signal if a fault is sensed in the step of sensing faults in the CPU;
terminating the step of modifying the accelerator pedal position signal if a fault is sensed in the step of sensing faults in the CPU; and
reengaging the step of modifying the accelerator pedal position signal by interrupting power to the CPU.

2. A fail-safe process for accelerator pedal signal modifiers of throttle-by-wire systems having a CPU electronically located between an accelerator pedal position signal and a vehicle ECU, comprising the steps of
sensing the accelerator pedal position signal;
transmitting the accelerator pedal position signal to the CPU;
checking the status of multiple parameters of the CPU;
sensing faults in the CPU based on the status of the multiple parameters of the CPU;
modifying the accelerator pedal position signal based on a preselected function;
bypassing the step of modifying the accelerator pedal position signal if a fault is sensed in the step of sensing faults in the CPU;
checking the status of the vehicle transmission in the ECU; and
bypassing the step of modifying the accelerator pedal position signal if the status of the vehicle transmission is in reverse gear.

3. A fail-safe process for accelerator pedal signal modifiers of throttle-by-wire systems having a CPU electronically located between an accelerator pedal position signal and a vehicle ECU, comprising the steps of
sensing the accelerator pedal position signal;
transmitting the accelerator pedal position signal to the CPU;
checking the status of a vehicle transmission in the ECU;
modifying the accelerator pedal position signal based on a preselected function;
bypassing the step of modifying the accelerator pedal position signal if the status of the vehicle transmission is a reverse gear; and
transmitting a resulting accelerator pedal position signal to the ECU.

4. A throttle-by-wire system comprising
a vehicle ECU;
an accelerator pedal producing an accelerator pedal position signal;
a CPU electronically located between the accelerator pedal position signal and the vehicle ECU, the CPU including a routine for modifying the accelerator pedal position signal, a safety bypass relay around the routine, a first relay function controlled according to sensed faults in the CPU to actuate the safety bypass relay, and a reverse bypass circuit controlled according to a status of a vehicle transmission in the ECU to bypass the routine.

5. A throttle-by-wire system comprising
a vehicle ECU;
an accelerator pedal producing an accelerator pedal position signal; and
a CPU electronically located between the accelerator pedal position signal and the vehicle ECU, the CPU including a routine for modifying the accelerator pedal position signal, a reverse bypass circuit around the routine controlled according to the status of a vehicle transmission in the ECU to actuate the bypass circuit when the transmission is in a reverse gear status.

* * * * *